(12) United States Patent
Mao

(10) Patent No.: US 11,923,925 B2
(45) Date of Patent: Mar. 5, 2024

(54) USER SELECTION FOR MU-MIMO COMMUNICATIONS

(71) Applicant: NOKIA TECHNOLOGIES OY, Espoo (FI)

(72) Inventor: Weiqiang Mao, Zhejiang (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/253,957

(22) PCT Filed: Jun. 25, 2018

(86) PCT No.: PCT/CN2018/092662
§ 371 (c)(1),
(2) Date: Dec. 18, 2020

(87) PCT Pub. No.: WO2020/000138
PCT Pub. Date: Jan. 2, 2020

(65) Prior Publication Data
US 2021/0250067 A1    Aug. 12, 2021

(51) Int. Cl.
*H04B 7/0452*    (2017.01)
*H04B 7/0456*    (2017.01)
(Continued)

(52) U.S. Cl.
CPC ......... *H04B 7/0452* (2013.01); *H04B 7/0456* (2013.01); *H04L 25/0254* (2013.01);
(Continued)

(58) Field of Classification Search
CPC . H04B 7/0452; H04B 7/0456; H04L 25/0254; H04L 25/03955; H04W 72/048; H04W 72/1263
See application file for complete search history.

(56) References Cited

U.S. PATENT DOCUMENTS

2003/0128658 A1* 7/2003 Walton ............... H04L 5/0023
370/208
2008/0227495 A1   9/2008 Kotecha et al.
(Continued)

FOREIGN PATENT DOCUMENTS

CN        101 568 064 A      10/2009
CN         101754346 A        6/2010
(Continued)

OTHER PUBLICATIONS

Bjornson et al., "Optimality Properties, Distributed Strategies, and Measurement-Based Evaluation of Coordinated Multicell OFDMA Transmission", Dec. 2011, IEEE, IEEE Transactions on Signal Processing, vol. 59, 12, pp. 6086-6101 (Year: 2011).*
(Continued)

*Primary Examiner* — Michael K Phillips
(74) *Attorney, Agent, or Firm* — SQUIRE PATTON BOGGS (US) LLP

(57) ABSTRACT

Embodiments of the present disclosure relate to a method, device and computer readable medium for user selection for MU-MIMO communications. In example embodiments, the method comprises for a set of candidate terminal devices, performing scheduling by: obtaining a set of received signals; determining a set of measurements for relevance among the candidate terminal devices based at least on the set of received signals and channel estimation for the set of candidate terminal devices; determining a maximum measurement in the set of measurements; and updating the set of candidate terminal devices by removing a candidate terminal device associated with the maximum measurement from the set of candidate terminal devices.

11 Claims, 7 Drawing Sheets

(51) Int. Cl.
*H04L 25/02* (2006.01)
*H04W 72/1263* (2023.01)
*H04W 72/51* (2023.01)
*G06N 3/048* (2023.01)
*G06N 3/063* (2023.01)

(52) U.S. Cl.
CPC ....... *H04W 72/1263* (2013.01); *H04W 72/51* (2023.01); *G06N 3/048* (2023.01); *G06N 3/063* (2013.01)

(56) References Cited

U.S. PATENT DOCUMENTS

| | | | | |
|---|---|---|---|---|
| 2008/0247475 | A1* | 10/2008 | Kim | H04B 7/0619 375/260 |
| 2013/0089165 | A1 | 4/2013 | Chen et al. | |
| 2014/0198750 | A1 | 7/2014 | Prasad et al. | |
| 2016/0088648 | A1 | 3/2016 | Xue et al. | |
| 2017/0181183 | A1* | 6/2017 | Sung | H04B 7/063 |

FOREIGN PATENT DOCUMENTS

| | | |
|---|---|---|
| CN | 103560985 A | 2/2014 |
| CN | 105406905 A | 3/2016 |
| CN | 106688193 A | 5/2017 |
| CN | 107302385 A | 10/2017 |

OTHER PUBLICATIONS

Yoo et al., "On the Optimality of Multiantenna Broadcast Scheduling Using Zero-Forcing Beamforming", Mar. 2006, IEEE, IEEE Journal on Selected Areas in Communications, vol. 24, No. 3, pp. 528-541 (Year: 2006).*
Kuerbis et al., User Scheduling in Massive MIMO Systems with a Large Number of Devices, Oct. 8-13, 2017, IEEE, 2017 IEEE 28th Annual International Symposium on Personal, Indoor, and Mobile Radio Communications (PIMRC) (Year: 2017).*
International Search Report and Written Opinion dated Mar. 14, 2019 corresponding to International Patent Application No. PCT/CN2018/092662.
Extended European Search Report dated Jan. 18, 2022 corresponding to European Patent Application No. 18924493.2.
First Office Action dated Oct. 17, 2022 corresponding to Chinese Patent Application No. 201880096828.8, with Search Report.
Communication pursuant to Article 94(3) EPC issued in corresponding European Patent Application No. 18 924 493.2 dated Nov. 28, 2023.

* cited by examiner

USER SELECTION FOR MU-MIMO COMMUNICATIONS

CROSS-REFERENCE TO RELATED APPLICATION

The present application is a national stage application, under 35 U.S.C. 371, of PCT/CN2018/092662, filed Jun. 25, 2018.

TECHNICAL FIELD

Embodiments of the present disclosure generally relate to the field of telecommunications, and in particular, to a method, device and computer readable medium for user selection for multi-user multiple input multiple output (MU-MIMO) communications.

BACKGROUND

In a MIMO or massive MIMO communication system, one of the most attractive functions is the usage of spatial multiplexing to improve system capacity. This function is called MU-MIMO. MU-MIMO supports scheduling of multiple users by using same frequency resources at the same time.

In MU-MIMO communications, one of the key problems is the user selection, which is also referred to as user pairing. User selection means selecting a number of users from a set of candidate users to be scheduled in the next round so as to reach the expected performance, for example, to maximize the system capacity. Therefore, there is a need to select a number of users so as to maximize the system capacity with the constrain of transmitting power.

SUMMARY

In general, example embodiments of the present disclosure provide a method, device and computer readable medium for user selection for MU-MIMO communications.

In a first aspect, a method for user selection is provided. The method comprises for a whole set of candidate terminal devices, performing scheduling by: obtaining a set of received signals; determining a set of measurements for relevance among the candidate terminal devices based at least on the set of received signals and channel estimation for the set of candidate terminal devices; determining a maximum relevance measurement in the set of measurements; and updating the set of candidate terminal devices by removing a candidate terminal device associated with the maximum relevance measurement from the set of candidate terminal devices.

In some embodiments, performing scheduling includes iteratively doing until an end condition is met, the end condition including one of the following: the number of the candidate terminal devices being less than or equal to a threshold number and channel capacity for the set of candidate terminal devices being less than channel capacity for the updated set of candidate terminal devices; the number of the candidate terminal devices being less than or equal to the threshold number and a convergence rate being below than a predetermined threshold, the convergence rate being determined based on a change in a sum of the measurements.

In some embodiments, wherein determining the set of measurements for relevance comprises iteratively performing the following at least once until an iteration number is equal to a predetermined number: determining residue between each received signal and its corresponding output of an artificial neuron network, ANN, having an input layer and an output layer, each of row vectors of a stream channel matrix being an input of the ANN, each of the receiving signals being an output of the ANN, an activation function for a neuron of the output layer being a linear activation function, the stream channel matrix being a product of a channel estimation matrix and a receiving beamforming matrix for the set of candidate terminal devices; determining the set of measurements for relevance based on the residue; and updating a set of weights of the ANN based on a gradient descent algorithm.

In some embodiments, updating the set of weights of the ANN comprises: determining a set of adjust rates for a learning rate based on the stream channel row vectors; determining a set of adjusted learning rates based on the set of adjust rates; and updating the set of weights based on the set of adjusted learning rates, the residue and the stream channel matrix.

In some embodiments, determining the set of measurements for relevance comprises: determining a relevance measurement between a first candidate terminal device and a plurality of second candidate terminal devices in the set of candidate terminal devices based on the following: a size of a projection of a first channel vector for the first candidate terminal device on a space constructed by channel vectors for the second candidate terminal devices, the first candidate terminal device being different from any of the second candidate terminal devices.

In some embodiments, obtaining the set of received signals comprises: determining lengths of row vectors in the stream channel matrix; arranging the row vectors in an order of the lengths; assigning transmitted symbols to the arranged row vectors so that different transmitted symbols are assigned to adjacent row vectors; and determining products of the transmitted symbols and lengths of the arranged row vectors as the set of received signals.

In a second aspect, there is provided a device for user selection. The device comprises at least one processor and at least one memory including computer program code. The at least one memory and the computer program code are configured to, with the at least one processor, cause the device to: for a whole set of candidate terminal devices, perform scheduling by: obtaining a set of received signals; determining a set of measurements for relevance among the candidate terminal devices based at least on the set of received signals and channel estimation for the set of candidate terminal devices; determining a maximum relevance measurement in the set of measurements; and updating the set of candidate terminal devices by removing a candidate terminal device associated with the maximum relevance measurement from the set of candidate terminal devices.

In some embodiments, performing scheduling includes iteratively doing until an end condition is met, the end condition including one of the following: the number of the candidate terminal devices being less than or equal to a threshold number and channel capacity for the set of candidate terminal devices being less than channel capacity for the updated set of candidate terminal devices; the number of the candidate terminal devices being less than or equal to the threshold number and a convergence rate being below than a predetermined threshold, the convergence rate being determined based on a change in a sum of the measurements.

In some embodiments, determining the set of measurements for relevance comprises iteratively performing the following at least once until an iteration number is equal to a predetermined number: determining residue between each received signal and its corresponding output of an artificial neuron network, ANN, having an input layer and an output layer, each of row vectors of a stream channel matrix being an input of the ANN, each of the receiving signals being an output of the ANN, an activation function for a neuron of the output layer being a linear activation function, the stream channel matrix being a product of a channel estimation matrix and a receiving beamforming matrix for the set of candidate terminal devices; determining the set of measurements for relevance based on the residue; and updating a set of weights of the ANN based on a gradient descent algorithm.

In some embodiments, updating the set of weights of the ANN comprises: determining a set of adjust rates for a learning rate based on the stream channel row vectors; determining a set of adjusted learning rates based on the set of adjust rates; and updating the set of weights based on the set of adjusted learning rates, the residue and the stream channel matrix.

In some embodiments, determining the set of measurements for relevance comprises: determining a relevance measurement between a first candidate terminal device and a plurality of second candidate terminal devices in the set of candidate terminal devices based on the following: a size of a projection of a first channel vector for the first candidate terminal device on a space constructed by channel vectors for the second candidate terminal devices, the first candidate terminal device being different from any of the second candidate terminal devices.

In some embodiments, obtaining the set of received signals comprises: determining lengths of row vectors in the stream channel matrix; arranging the row vectors in an order of the lengths; assigning transmitted symbols to the arranged row vectors so that different transmitted symbols are assigned to adjacent row vectors; and determining products of the transmitted symbols and lengths of the arranged row vectors as the set of received signals.

In a third aspect, there is provided a computer-readable medium storing a computer program thereon. The computer program, when executed by a processor, causes the processor to carry out the method according to the first aspect.

In a fourth aspect, there is provided an apparatus for user selection. The apparatus comprises: means for performing scheduling for a whole set of candidate terminal devices by: obtaining a set of received signals; determining a set of measurements for relevance among the candidate terminal devices based at least on the set of received signals and channel estimation for the set of candidate terminal devices; determining a maximum relevance measurement in the set of measurements; and updating the set of candidate terminal devices by removing a candidate terminal device associated with the maximum relevance measurement from the set of candidate terminal devices.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
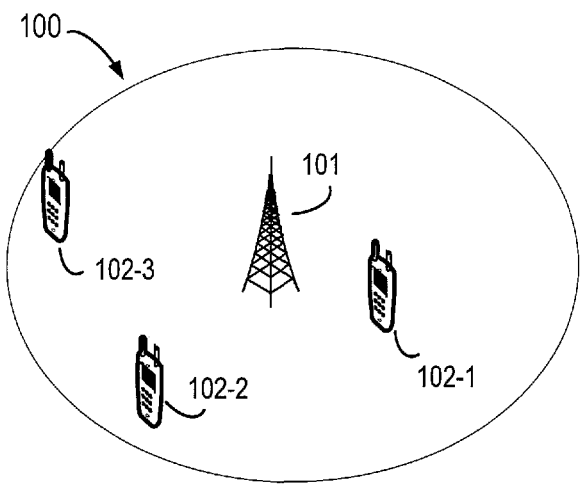
FIG. 1 shows an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, MIMO, OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, a downlink (DL) transmission refers to a transmission from a network device to a terminal device, and an uplink (UL) transmission refers to a transmission in an opposite direction. That is, in DL, the network device is a transmitter and the terminal device is a receiver device; while in UL, the terminal device is a transmitter and the network device is a receiver device.

FIG. 1 illustrates an example wireless communication network 100 in which embodiments of the present disclosure may be implemented. As shown, the wireless communication network 100 may include one or more network devices, for example, network device 101. The network device 101 may be in a form of a base station (BS), a Node B (NB), an evolved NB (eNB), a gNB, a virtual BS, a Base Transceiver Station (BTS), or a Base Station Subsystem (BSS), AP and the like.

The network device 101 may provide service to a set of terminal devices 102-1, 102-2, and 102-3, which is collectively referred to as "terminal devices 102", within its coverage. It should be appreciated that in some embodiments, the network device may provide service to less or more terminal devices and the number of the terminal devices in this example does not suggest any limitations to the scope of the present disclosure.

In some embodiments, the network device 101 may serve terminal devices, e.g., terminal devices 102 in FIG. 1, within its coverage with a plurality of antennas. For example, the network device 101 may be equipped with a plurality of transmitting antennas, and/or a plurality of receiving antennas. Likewise, in some embodiments, some or all of the terminal devices 102 may be equipped with a plurality of antennas for transmitting and/or receiving. In addition, some or all of the terminal devices 102 may be scheduled to transmit or receive in the same or overlapped time-frequency resource, thereby forming a MU-MIMO communication. Therefore, there is a need to select a plurality of terminal devices (which are also referred to users herein) from a set of candidate terminal devices (which are also referred to candidate users herein) so as to maximize the system capacity with the constrain of transmitting power.

Implementations of the present disclosure relate to user selection for MU-MIMO communications. The MU-MIMO communications may include downlink (DL) MU-MIMO communications and uplink (UL) MU-MIMO communications. The UL MU-MIMO communications differ from the DL MU-MIMO communications in the description of transmitting and receiving antennas. For UL MU-MIMO user selection problem, it can be transferred to a DL MU-MIMO user selection problem by constructing DL channel estimation matrix for candidate users as the transpose of UL channel estimation matrix. Therefore, DL MU-MIMO communications will be described only for the purpose of illustration and help those skilled in the art to understand idea and principle of the present disclosure, without suggesting any limitations as to the scope of the disclosure. The user selection solution of the present disclosure can be used with any of UL MU-MIMO communications and DL MU-MIMO communications.

In general, in a MU-MIMO system, a channel model for a user k in a set of candidate users may be expressed as Equation (1):

$$y_k = D_k^H H_k \sum_{i=1}^{K} M_k x_k + z_k \qquad (1)$$

where:
Nt represents the number of transmitting antennas in a network device;
K represents the number of active users in the cell of interest and focuses on data transmission on a resource block in each scheduling interval;
$Nr_k$ represents the number of receiving antennas of user k among candidate users;
Nr represents the total number of receiving antennas of all candidate users, $$Nr = \sum_{k=1}^{K} Nr_k$$

$S_k$ represents the number of streams for user k, where $S_k <= Nr_k$
S represents the total number of streams for all candidate users, $S=SUM(S_k)$, where $S <= Nt$;
$x_k$ represents a transmitted symbol vector for user k and its size is $(S_k, 1)$ (i.e., $S_k$ rows and one column);
$M_k$ represents a precoding matrix for user k, its column vectors are orthogonal with one another and each of the column vectors has a unit length, and its size is $(Nt, S_k)$;
$H_k$ represents a channel estimation matrix for user k, and its size is $(Nr_k, Nt)$;
$D_k$ represents a receiving beamforming vector for user k, its size is $(Nr_k, S_k)$, and the superscript H means conjugate transpose operation to matrix $D_k$;
$y_k$ represents a received signal vector in user k after beamforming, and its size is $(S_k, 1)$; and
$z_k$ represents additive normal distribution noise, and its size is $(S_k, 1)$.

Suppose y represents a received signal matrix for all candidate users:

$$y = \begin{pmatrix} y_1 \\ y_2 \\ \vdots \\ y_K \end{pmatrix} \qquad (2)$$

where y has a size of (S,1).
Suppose:
$$\hat{H}_k = D_k^H H_k \qquad (3)$$

where $\hat{H}_k$ has a size of $(S_k, Nt)$
It may be defined:

$$\hat{H} = \begin{pmatrix} \hat{H}_1 \\ \hat{H}_2 \\ \vdots \\ \hat{H}_K \end{pmatrix} \qquad (4)$$

where $\hat{H}$ has a size of (S, Nt), and represents channel estimation with receiving beamforming matrix.
Suppose x represents a transmitted signal matrix for all candidate users:

$$x = \begin{pmatrix} x_1 \\ x_2 \\ \vdots \\ x_K \end{pmatrix} \qquad (5)$$

where x has a size of (S,1)
Suppose M represents a transmitting precoder matrix:

$$M = (M_1 M_2 \ldots M_K) \qquad (6)$$

where M has a size of (Nt, S)
Thus, for all candidate users, the received signal matrix y can be written as:

$$y = \hat{H} Mx + z \qquad (7)$$

In Equation (7), it is supposed that each user has only one stream. For a user having multiple streams, this user can be considered as multiple virtual users, each of which has only one stream. Thus, there are total S users, each of which has one stream, where $S <= Nt$.

Embodiments of the present disclosure relates to selecting uNum users or less than uNum users from S candidate users for next round MU-MIMO scheduling (where uNum<=Nt) so as to maximize the system capacity with the constrain of transmitting power.

In embodiments of the present disclosure, equal power allocation solution for the users is considered since power allocation solution is not key issue for user selection. The embodiments of the present disclosure can be used with other power allocation solution, for example, water filling based power allocation solution, etc.

Currently, the ZF greedy algorithm for MU-MIMO user selection problem was proposed. According to the ZF greedy algorithm, one user is selected firstly, then one more user is added to the selected user set in each iteration, until the required uNum users are selected. In each iteration of the ZF greedy algorithm, it needs checking all of the left users one by one to find the best one. Computer instructions for the ZF greedy algorithm may be constructed as the following:

ZF Greedy Algorithm
Input:
    Candidate user set: U
    Channel matrix: H
    Max selected user number: uNum
Initialization:
    Set k=1
    Find a user $w_1$, such that $w_1 = \text{argmax}_{u \in U}(H_u H_u^H)$
    Set $W_1 = \{w_1\}$, and denote the achieved rate as $R_{zf}(W_1)$.
While k<uNum:
    Increase k by 1
    Find a user, $w_k$, such that $w_k = \text{argmax}_{u \in U \setminus W_{k-1}} R_{zf}(W_{k-1} \cup \{u\})$
    Set $W_k = W_{k-1} \cup \{w_k\}$, and denote the achieved rate as $R_{zf}(W_k)$
    If $R_{zf}(W_k) <= R_{zf}(W_{k-1})$ break, and decrease k by 1
End of ZF Greedy Algorithm In the above ZF greedy algorithm, $H_u$ represents a row vector for user u. The channel capacity for user $w_k$ may be expressed as:

$$R_{zf}(w_k) = \log_2(1 + p_{w_k} * c_k(H_W)) \qquad (8)$$

where $H_W$ represents the channel matrix constructed by the user set W, and:

$$c_k(H_W)=\{[(H_W H_W^H)^{-1}]_{k,k}\}^{-1} \quad (9)$$

If $(H_W H_W^H)$ cannot be inverted, then we set $c_k(H_W)=0$. Power is equally allocated among all the users:

$$p_{w_k}=P/len(W) \quad (10)$$

where P represents the total power. Len(W) represents the number of users in the user set W.
The total channel capacity for the user set W is determined as:

$$R_{zf}(W)=\Sigma_{w \in W} R_{zf}(w) \quad (11)$$

It may be understood that the ZF greedy algorithm has a computing complexity of $O(SNt^3)$. The complexity of $O(SNt^3)$ will make it difficult to use the ZF greedy algorithm in real mMIMO products, especially when the number Nt of the transmitting antennas in 5G gNodeB is very great.

In this ZF greedy algorithm, the user's normalized relevance measurements may be determined based on following equation:

$$delta(u) = \frac{H_u H_{W\setminus u}^H (H_{W\setminus u} H_{W\setminus u}^H)^{-1} H_{W\setminus u} H_u^H}{\|H_u\|^2} \quad (12)$$

where delta(u) represents a normalized relevance measurement between a user u and a plurality of other users than the user u in the user set W, $H_u$ represents a channel vector for the user u, $H_{W\setminus u}$ represents a space constructed by channel vectors for the other users. The physical meaning of the Equation (12) is a size of a projection of the channel vector $H_u$ on the space constructed by the channel vectors for the other users, and divided by square of a length of the vector $H_u$. In other words, delta(u) represents the size of the projection.

According to embodiments of the present disclosure, there is proposed a solution for user selection for MU-MIMO communications. This solution starts from all the users in a set of candidate users. A set of measurements for relevance among the candidate users is determined. A maximum measurement in the set of measurements is determined. A candidate user associated with the maximum measurement is removed from the set of candidate users. That is, a candidate user who has the most relevance with other users is removed. In this way, the set of candidate users is updated until there are only the required users left, who are the selected users. This solution has far more better computing performance than the conventional ZF greedy algorithm. This is especially important when both the maximum number of users that can be selected and the total number of candidate users are great. Principle and implementations of the present disclosure will be described in detail below with reference to FIGS. 2 to 7.

Figure 2:
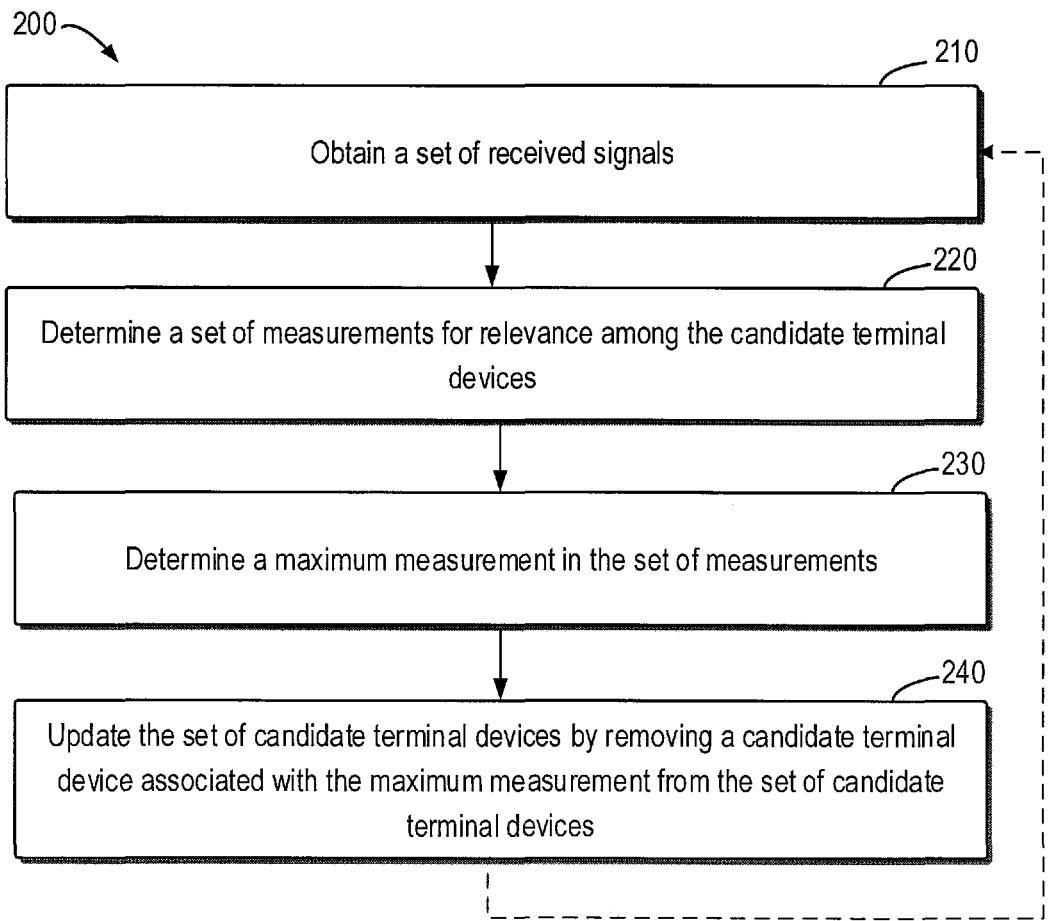
FIG. 2 shows a flowchart of a method for user selection in accordance with some embodiments of the present disclosure.

FIG. 2 shows a flowchart of a method 200 for user selection in accordance with some embodiments of the present disclosure. For the purpose of discussion, the method 200 will be described with reference to FIG. 1. For example, the method 200 may be implemented at the network device 101.

At 210, the network device 101 obtains a set of received signals. As described above, the user selection solution of the present disclosure may be used with UL MU-MIMO communications or DL MU-MIMO communications. In the case of the UL MU-MIMO communications, the received signals refer to the signals that are expected to be received by the network device 101 from the users 102. In the case of the DL MU-MIMO communications, the received signals refer to the signals that are expected to be received by the users 102.

For ease of discussion, the set of received signals is also referred to as "y vectors" and is represented by "y", the set of candidate users is represented by "W", the number of the candidate users in the set of candidate users is represented by "len(W)", and the required number of users, which is also referred to as a threshold number, is represented by "uNum".

For MU-MIMO user selection, Equation (7) may be normalized as following form:

$$y=\hat{H}\tilde{x} \quad (13)$$

where $$y = \begin{pmatrix} x_1\|\hat{H}_1\| \\ x_2\|\hat{H}_2\| \\ \vdots \\ x_S\|\hat{H}_S\| \end{pmatrix}; \tilde{x} = Mx \quad (14)$$

$\tilde{x}$ represents the precoding result for the transmitted symbol vector x for all users, y represents the set of expected received signal. This is reasonable because the optimal spatial gain that each user can get is the length of its row vector. Thus, $\tilde{x}$ can be calculated by using Equation (13) directly, instead of using precoder matrix anymore. In some embodiments, $\tilde{x}$ can be calculated by using an artificial neuron network (ANN), which will be described below with reference to FIG. 3.

Figure 3:
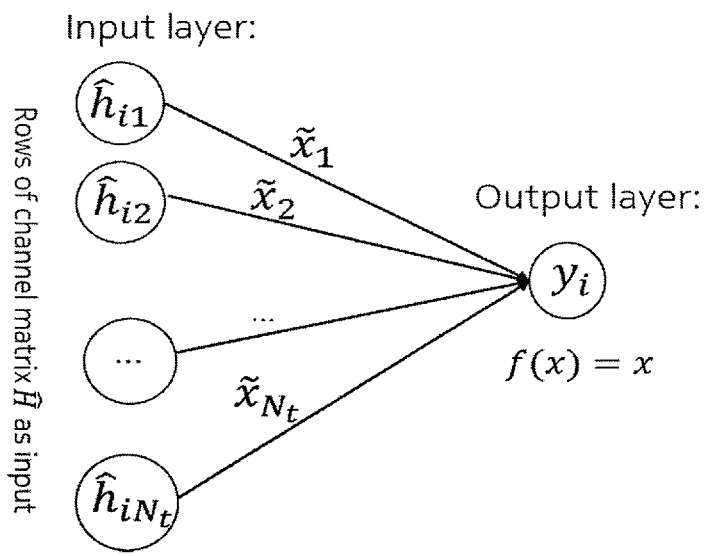
FIG. 3 shows a model of an artificial neuron network (ANN) having two layers.

FIG. 3 shows a model of an ANN including two layers. As shown, the ANN includes an input layer and an output layer. Each row vector $(\hat{h}_{i1}, \hat{h}_{i2}, \ldots, \hat{h}_{iNt})$ of the channel estimation matrix with receiving beamforming matrix, $\hat{H}$, may be used as an input vector of the input layer. An output $y_i$ of the output layer represents a received signal in the set of received signals associated with a corresponding row (the ith row) of $\hat{H}$, and $$y_i = \sum_{j=1}^{Nt} \hat{h}_{ij} * \tilde{x}_j.$$

The vector $\tilde{x}=[\tilde{x}_1, \tilde{x}_2, \ldots, \tilde{x}_{Nt}]$ is modelled as a set of parameters (which are also called weights) for the ANN. With this model, an activation function for a neuron of the output layer is a linear activation function and may be represented as f(x)=x, and there are S outputs in the output layer.

In some embodiments, a stochastic gradient descent (SGD) algorithm, which is conventionally used in machine learning and other related areas, is proposed to be used for updating the weights by iteration.

Although real signals transmitted by the network device can be used to generate the y vector for DL MU-MIMO user selection, this is not valid for UL MU-MIMO user selection since the network device does not know what is transmitted from users. Another potential problem to use real transmitted signals is that the real transmitted signals may not guarantee the data quality to differentiate different users. Thus, in some embodiments, a process for generating the y vector for MU-MIMO user selection is proposed, which will be described below with reference to FIG. 4.

Figure 4:
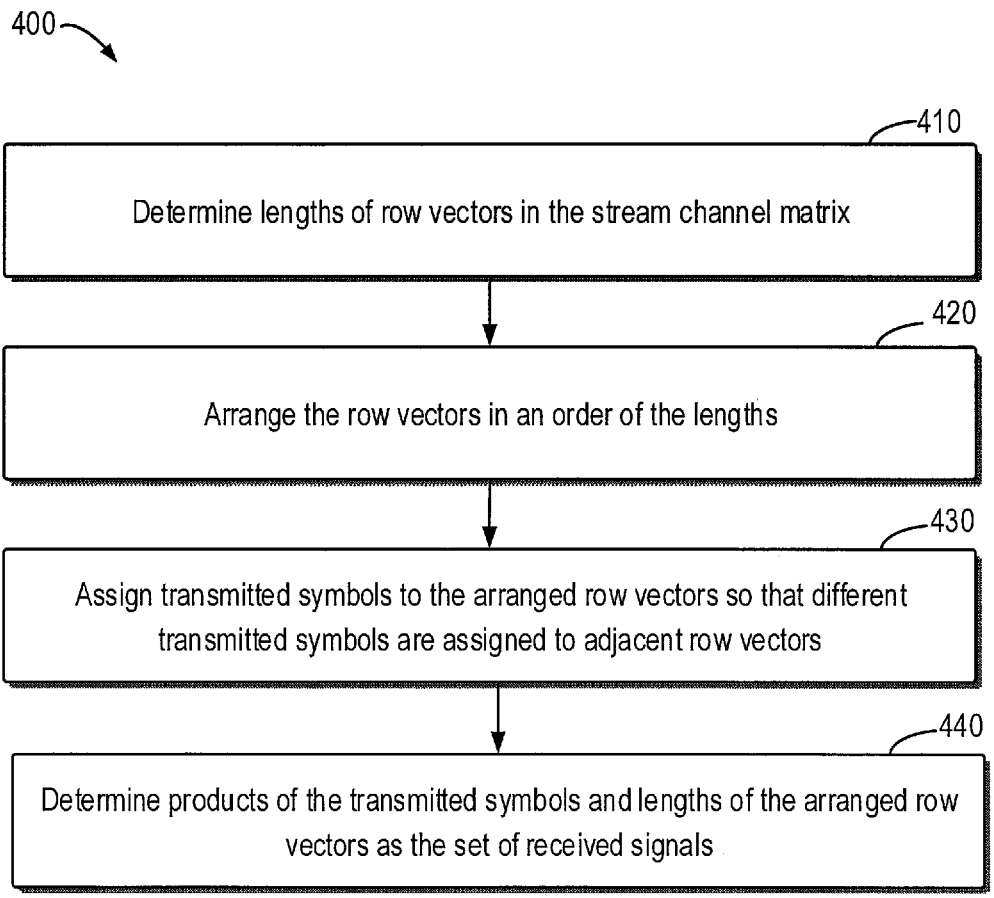
FIG. 4 shows a flowchart of a process for obtaining a set of received signals in accordance with some embodiments of the present disclosure.

FIG. 4 shows a flowchart of a process 400 for generating the y vector in accordance with some embodiments of the present disclosure. At 410, the network device 101 determines lengths of row vectors in a stream channel matrix $\hat{H}$ for the candidate users. The stream channel matrix $\hat{H}$ is a product of a channel estimation matrix and a receiving beamforming matrix for the set of candidate users. At 420, the network device 101 arranges the row vectors in an order of the lengths. For ease of discussion, the terms "channel estimation" and "stream channel estimation" may be used interchangeably and the terms "channel matrix" and "stream channel matrix" may be used interchangeably.

At 430, the network device 101 assigns transmitted symbols to the arranged row vectors so that different transmitted symbols are assigned to adjacent row vectors. At 440, the network device 101 determines products of the transmitted symbols and lengths of the arranged row vectors as the set of received signals.

A transmitted symbol may be represented by "yValue", and the yValue may be assigned to y. The target is to assign different values for adjacent rows (i.e., neighbour users). Normally, we can set yValue=1 for BPSK modulation and yValue=(1+1j)/sqrt(2) for complex modulation cases. For example, in the case of BPSK modulation, for two adjacent rows, y[k] and y[k+1], we can set y[k]=yValue*$\|\hat{H}_k\|$ and y[k+1]=−yValue*$\|\hat{H}_{k+1}\|$.

As an example rather than limitation, computer instructions for y vector generation may be constructed as the following.

y Vector Generation:
Input:
    $\hat{H}$ : channel estimation with receive beamforming matrix, which has a size of (S,Nt)
    rowset: row index set of $\hat{H}$ matrix, these selected rows (users) will join this round ANN operation and its corresponding y value is generated.
Output:
    y
Initialization:
    y=0 with size (S,1)
    yValue: yValue is assigned to y, the target is to assign different value for neighbour users, normally we can set yValue=1 for BPSK modulation and yValue=(1+1j)/sqrt(2) for complex modulation cases.
y Vector Generation Main Routine:
    rowset=sort(rowset) based on its corresponding row length of $\hat{H}$
    for k in rowset:

$$y[k] = yValue * \|\hat{H}_k\|$$
$$yValue = yValue * (-1)$$

Output: y
End of y Vector Generation

Referring back to FIG. 2, at 220, the network device 101 determines a set of measurements for relevance among the candidate users based at least on the set of received signals and channel estimation for the set of candidate users.

In some embodiments, there is proposed a process for determining a set of measurements for relevance based on an SGD algorithm, which will be described below with reference to FIG. 5.

Figure 5:
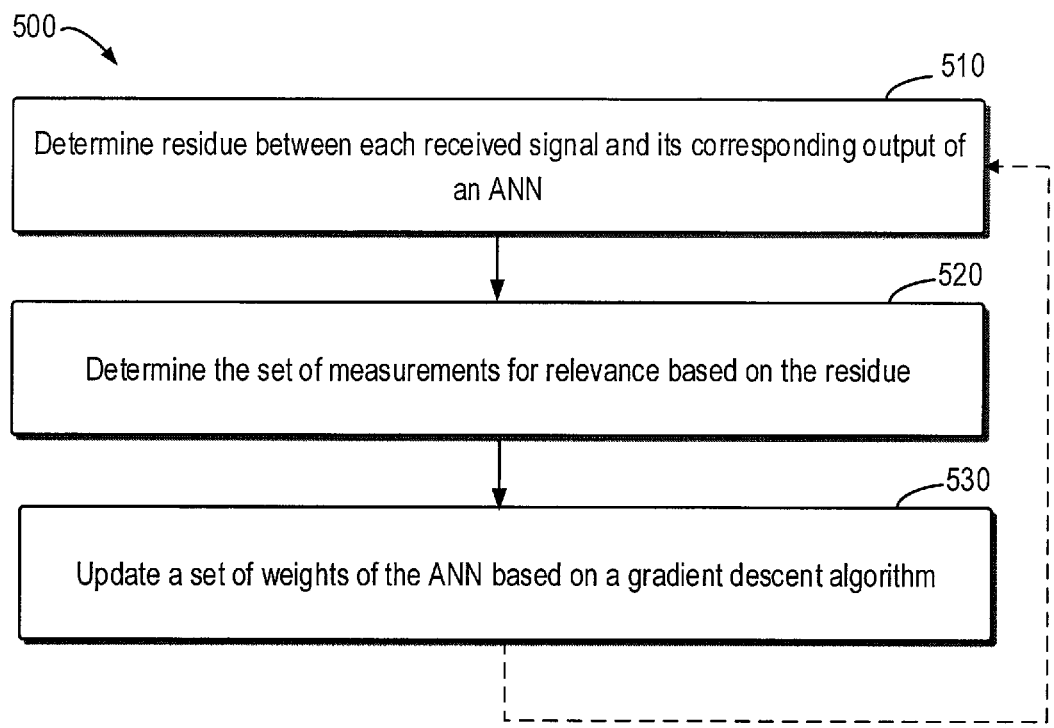
FIG. 5 shows a flowchart of a process for determining a set of measurements for relevance among the candidate terminal devices in accordance with some embodiments of the present disclosure.

FIG. 5 shows a process 500 for determining a set of measurements for relevance based on an SGD algorithm. As shown, at 510, the network device 101 determines residue between each received signal and its corresponding output of the ANN. The residue may be normalized and the normalized residue may be saved in a delta vector. The larger a delta value associated with a user, the greater the dependence of the user with other users in the user set. Each of row vectors of the stream channel matrix $\hat{H}$ is an input of the ANN, each of the receiving signals is an output of the ANN, and the activation function for a neuron of the output layer is f(x)=x.

At 520, the network device 101 determines the set of measurements for relevance based on the residue. At 530, the network device 101 updates a set of weights of the ANN based on a gradient descent algorithm.

In some embodiments, the network device 101 may iteratively perform the acts 510, 520 and 530 in FIG. 5 at least once until an iteration number is equal to a predetermined number.

In some embodiments, updating the set of weights of the ANN comprises: determining a set of adjust rates for a learning rate based on the row vectors; determining a set of adjusted learning rates based on the set of adjust rates; and updating the set of weights based on the set of adjusted learning rates, the residue and the stream channel matrix.

As an example rather than limitation, computer instructions for determining a set of measurements for relevance may be constructed as the following.

MU-MIMO ANN Algorithm:
Input:
    $\hat{H}$ : Channel estimation with receive beamforming matrix, which has a size of (S, Nt)
    rowset: row index set of $\hat{H}$ matrix, these selected rows will join this round ANN operation
Output:
    delta vector: normalized loss values for each row in rowset, which has a size of (S,1), but only the rows in rowset values are updated.
    cRate: convergent rate
Initialization:
    Set SGD epoch value: for example, epoch=20
    Set initial value of weights $\tilde{x}$=0
    Set learning rate, for example, η=0.7
    Optionally set learning rate adjust rate for each row, the purpose is bigger length row has bigger learning rate, for example, the adjust range is [0.85, 1.15], then the linear adjust rate equation is:

$$\text{adjRate}[k]=0.85+0.3*(\|\hat{H}_k\|-\min_i\|\hat{H}_i\|)/(\max_i\|\hat{H}_i\|-\min_i\|\hat{H}_i\|) \quad (15)$$

Set initial delta=0
    Set y based on the y vector generation method
MU-MIMO ANN Algorithm Main Routine:
For ep=0 to epoch:
    For k in rowset:

For $\hat{H}_k$ row, calculate the delta value: (16)

$$\delta_k = y_k - \sum_{j=1}^{Nt} \hat{h}_{kj} * \tilde{x}_j$$

Update the delta value:

-continued $$delta[k] = \|\delta_k\|/\|\hat{H}_k\|^2 \quad (17)$$

For $j = 0$ to $Nt$:

Do the weight updating:

$$\tilde{x}_j \leftarrow \tilde{x}_j + \frac{\eta * adjRate[k] * \delta_k * \hat{h}^*_{kj}}{\|\hat{H}_k\|^2} \quad (18)$$

If this is the second last epoch:

$d2$=sum(delta)

If this is the last epoch:

$d1$=sum(delta)

cRate=$d1/d2$

Output: delta; cRate
End of MU-MIMO ANN Algorithm

In the above Equation (15), adjRate[k] represents the adjust rate for the $k^{th}$ row in the row index set (represented by the rowset) of matrix $\hat{H}$ and $\|\hat{H}_k\|$ represents a length of the row vector $\hat{H}_k$ in the $k^{th}$ row, $\max_i\|\hat{H}_i\|$ represents a maximum among lengths of the row vectors in the candidate user set, $\min_i\|\hat{H}_i\|$ represents a minimum among lengths of the row vectors in the candidate user set.

It may be understood from above Equation (15), the adjust rate is determined based on a length of a row vector in the matrix $\hat{H}$. The larger the length, the greater the associated adjust rate and the greater the learning rate. In some embodiments, the adjust rate may be in the range [0.85, 1.15].

In addition, it may be understood from the above MU-MIMO ANN algorithm main routine, a convergence rate, which is represented by "cRate", is also output. The convergence rate is determined as $d1/d2$, where $d2$ represents a sum of the elements in the delta vector obtained in the second last iteration, and $d1$ represents a sum of the elements in the delta vector obtained in the last iteration.

It may be understood from above Equation (18), for the $j^{th}$ transmitting antenna, the weight (i.e., $\tilde{x}_j$) is updated based on the learning rate ($\eta$), the residue ($\delta_k$) and the length of the row vector $\hat{H}_k$, the adjust rate (adjRate[k]), a conjugate $\hat{h}^*_{kj}$ of the element $\hat{h}_{kj}$ in the row vector $\hat{H}_k$.

In some embodiments, optimized learning rate, adjust rate and iteration number (epoch) may be determined in advance, for example, by testing and stored in a loop-up table for later use.

Learning Rate Design

For cRate output of ANN, different learning rates can cause different values of cRate. For delta output of ANN, because only size of the delta vector is compared, the learning rate is not related with relevance.

The learning rate is verified by testing, where each row uses same 200 sample data for different learning rates and adjRate is not used, the selected user number uNum=6. For illustration purpose, some learning rates for different antenna number, the different number of the users are listed in Table 1.

TABLE 1

| learning rate | 0.3 | 0.5 | 0.7 | 0.8 |
|---|---|---|---|---|
| S = 12; Nt = 6 | 8.777861029 | 9.018535251 | 9.084484605 | 9.058546873 |
| | 9.025284886 | 9.150469012 | 9.117079946 | 9.127410588 |
| | 8.701357372 | 8.901002814 | 8.912049244 | 8.923757947 |
| | 9.049075476 | 9.162042033 | 9.182157812 | 9.1850812 |
| S = 12; Nt = 12 | 10.27224022 | 10.35838559 | 10.35933018 | 10.35746938 |
| | 10.28383373 | 10.40597636 | 10.38898365 | 10.38535312 |
| | 10.15416233 | 10.2680526 | 10.29628167 | 10.24610821 |
| | 10.19467035 | 10.30414293 | 10.3177046 | 10.28014704 |
| S = 12; Nt = 20 | 10.87462983 | 10.95755392 | 10.94896653 | 10.90571471 |
| | 10.84888834 | 10.90314831 | 10.9056346 | 10.88291072 |
| | 10.5590689 | 10.6294547 | 10.59935739 | 10.53560472 |
| | 10.60337922 | 10.63587469 | 10.60175395 | 10.55137247 |

Here each float value means the average rate, it is founded that the learning rates of 0.5 and 0.7 are a little bit better.

Further verification is performed for the learning rates of 0.5 and 0.7 in adjRate design.

adjRate Design

For illustration purpose, testing result for learning rate of 0.5 is listed in Table 2.

TABLE 2

| | 0.75 | 0.8 | 0.85 | 0.9 |
|---|---|---|---|---|
| S = 12; Nt = 6 | 8.938157597 | 8.956509476 | 8.96943016 | 8.962542634 |
| | 8.912331166 | 8.926515011 | 8.946046992 | 8.949108951 |
| S = 12; Nt = 12 | 10.35153401 | 10.36368195 | 10.35589687 | 10.36062192 |
| | 10.3019542 | 10.30588745 | 10.30973567 | 10.296437 |
| S = 12; Nt = 20 | 10.8927139 | 10.89454696 | 10.88046763 | 10.83812765 |
| | 10.91424952 | 10.89186399 | 10.88676588 | 10.85463904 |

For illustration purpose, testing result for learning rate of 0.7 is listed in Table 3.

TABLE 3

| Learning rate = 0.7 | 0.75 | 0.8 | 0.85 | 0.9 |
|---|---|---|---|---|
| S = 12; Nt = 6 | 8.951316341 | 8.960766639 | 9.006401109 | 9.033310537 |
|  | 9.019669752 | 9.024254299 | 9.026610285 | 9.026450969 |
| S = 12; Nt = 12 | 10.36246681 | 10.36089358 | 10.36360321 | 10.36923474 |
|  | 10.31148043 | 10.29564009 | 10.29684047 | 10.28006457 |
| S = 12; Nt = 20 | 10.89424624 | 10.89598353 | 10.8652812 | 10.82175103 |
|  | 10.9216486 | 10.90026838 | 10.86532404 | 10.82893891 |

In Table 3, the first line shows the different adjRate values. In the test, the same 200 sample data for each row is used. By this testing, learning rate=0.7 and adjRate=0.85 looks a little bit better.

SGD Epoch Value Design

SGD epoch value is not considered as a big issue for this ANN since ANN weights are not required to be output. Thus, the epoch of 20 is used.

Referring back to FIG. 2, at 230, the network device 101 determines a maximum measurement in the set of measurements. At 240, the network device 101 updates the set of candidate users by removing a candidate user associated with the maximum measurement from the set of candidate users.

In some embodiments, the network device 101 may iteratively perform the acts 210 to 240 until an end condition is met, so that the system capacity can be maximized.

Figure 6:
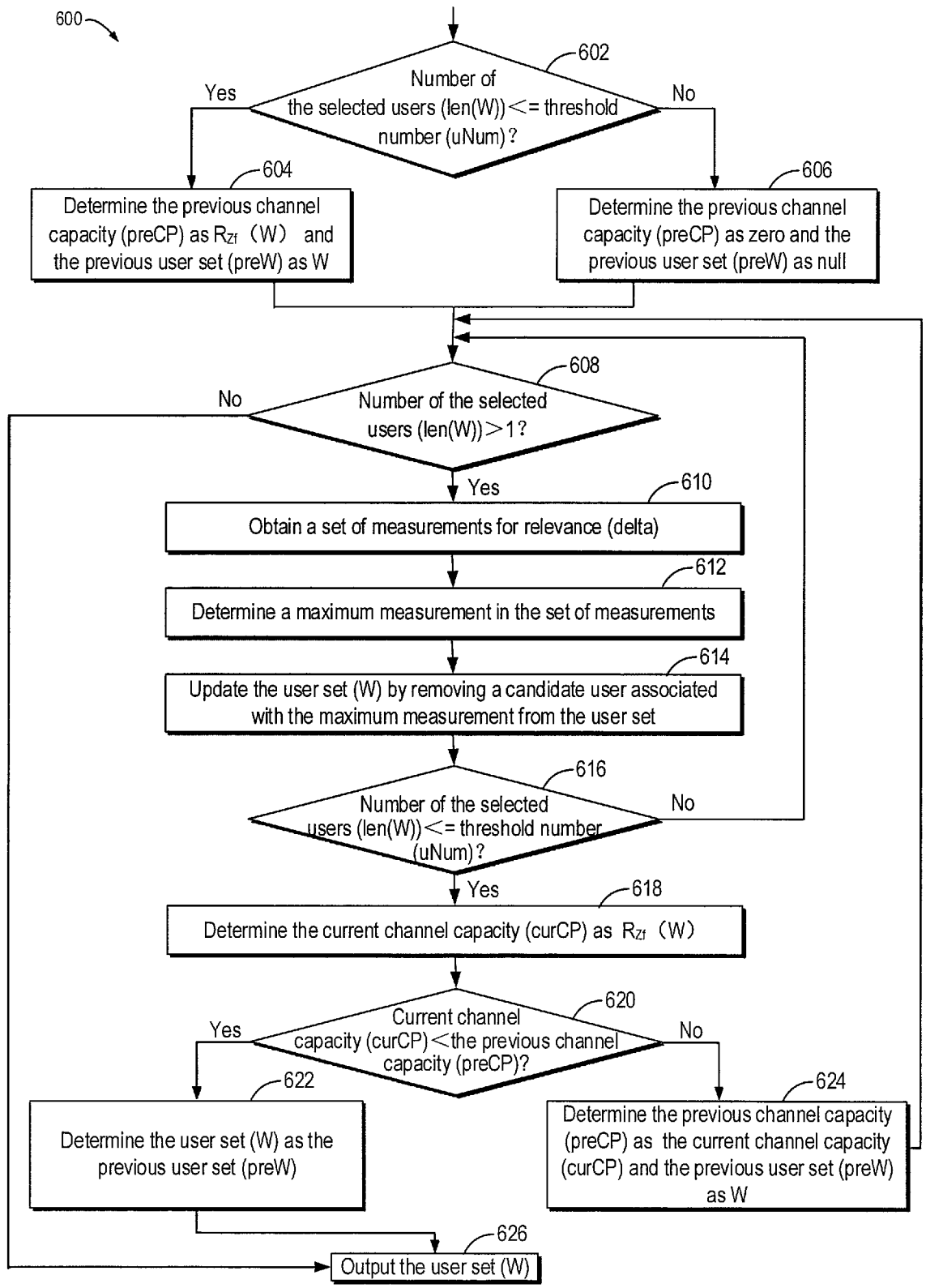
FIG. 6 shows a flowchart of an example implementation of the method in accordance with some embodiments of the present disclosure.

In some embodiments, the end condition includes the number of the candidate users being less than or equal to a threshold number and channel capacity for the set of candidate users being less than channel capacity for the updated set of candidate users (which will be referred to as the end condition based on channel capacity). FIG. 6 shows a flowchart of an example process 600 by using the end condition based on channel capacity.

As shown, at 602, the network device 101 determines whether the number of the selected users (len(W)) is equal to or less than the threshold number (uNum).

If the number of the selected users (len(W)) is equal to or less than the threshold number (uNum), the network device 101 determines the previous channel capacity (preCP) as $R_{zf}(W)$ and determines the previous user set (preW) as the user set W at 604. The previous channel capacity (preCP) represents the channel capacity determined in the last iteration. In some embodiments, $R_{zf}(W)$ may be determined by using the Equation (11). The previous user set (preW) represents the user set determined in the last iteration.

If the number of the selected users (len(W)) is greater than the threshold number (uNum), the network device 101 determines the previous channel capacity (preCP) as zero and determines the previous user set (preW) as null at 606.

At 608, the network device 101 determines whether the number of the selected users (len(W)) is greater than 1.

If the number of the selected users (len(W)) is greater than 1, the process 600 proceeds to 610, where the network device 101 obtains a set of measurements for relevance (delta vector). In some embodiments, the act at 610 may be performed by using the MU-MIMO ANN algorithm as described above.

At 612, the network device 101 determines a maximum measurement in the set of measurements. At 614, the network device 101 updates the user set (W) by removing a candidate user associated with the maximum measurement from the user set.

At 616, the network device 101 determines whether the number of the selected users (len(W)) is equal to or less than the threshold number (uNum).

If the number of the selected users (len(W)) is equal to or less than the threshold number (uNum), the network device 101 determines the current channel capacity (curCP) as $R_{zf}(W)$ at 618. The current channel capacity represents the channel capacity determined in the current iteration. In some embodiments, $R_{zf}(W)$ may be determined by using the Equation (11).

At 620, the network device 101 determines whether the current channel capacity (curCP) is less than the previous channel capacity (preCP).

If the current channel capacity (curCP) is less than the previous channel capacity (preCP), the process 600 proceeds to 622, where the network device 101 determines the user set (W) as the previous user set (preW). At 626, the user set (W) is output.

If the current channel capacity (curCP) is equal to or greater than the previous channel capacity (preCP), the process 600 proceeds to 624, where the network device 101 determines the previous channel capacity (preCP) as the current channel capacity (curCP) and determines the previous user set (preW) as W. Then, the process 600 returns to 608.

On the other hand, if the network device 101 determines at 608 the number of the selected users (len(W)) is equal to or less than 1, the process 600 proceeds to 626, where the user set (W) is output.

As an example rather than limitation, computer instructions for implementing the example process 600 may be constructed as the following.

ANN Greedy Algorithm with End Condition Based on the Channel Capacity
Input:
    Ĥ: Channel estimation with receive beamforming matrix, which has a size of (S,Nt) Selected user number: uNum, where uNum<S, S is the total candidate user number
Output:
    Selected user set: W
Initialization:
    Set initial user set W: it includes all candidate users, so len(W)=S, where len(W) represents the user number of the set W
ANN Greedy Algorithm Main Routine:
    If len(W)<=uNum: preCP=$R_{zf}(W)$; preW=W
    Else: preCP=0; preW={ }
    While len(W)>1:
    Run MU-MIMO ANN algorithm for user set W, get the delta value
    Find the user u which has the maximum delta value:
        u=argmax$_{u \in W}$(delta[u])

Update user set: W=W†{u}
If len(W)<=uNum:
   curCP=$R_{zf}$(W)
   If curCP<preCP: W=preW; break
   Else: preCP=curCP; preW=W
output: W
End of ANN Greedy Algorithm with End Condition Based on the Channel Capacity In some embodiments, the end condition includes the number of the candidate users being less than or equal to a threshold number and a convergence rate being below than a predetermined threshold (which is also referred to as the end condition based on convergence rate). The convergence rate is determined based on a change in a sum of the measurements. In some embodiments, the convergence rate may be determined by using the MU-MIMO ANN algorithm for user set W as described above.

Figure 7:
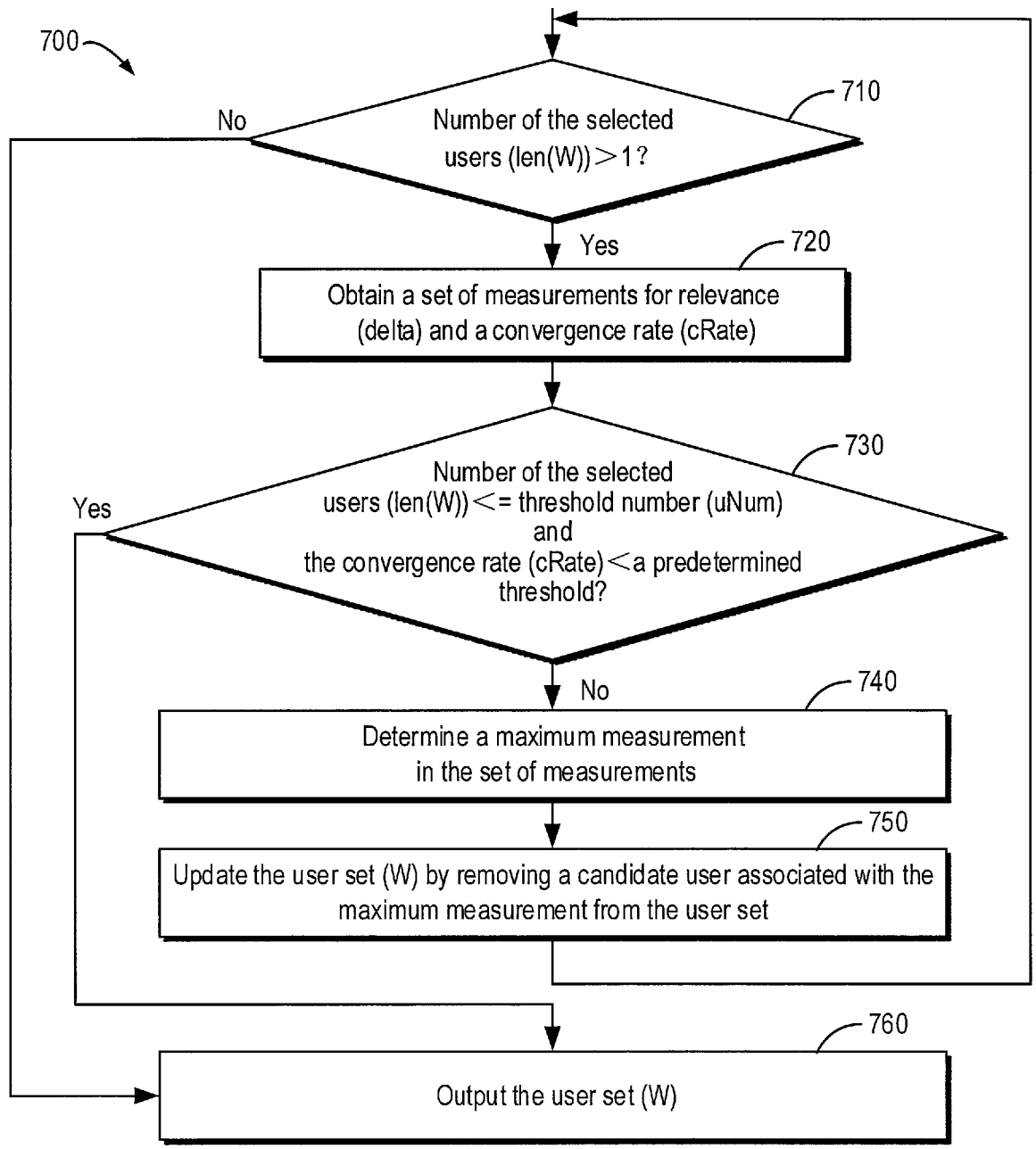
FIG. 7 shows a flowchart of a further example implementation of the method in accordance with some embodiments of the present disclosure.

FIG. 7 shows a flowchart of an example process 700 by using the end condition based on the convergence rate. As shown, at 710, the network device 101 determines whether the number of the selected users (len(W)) is greater than 1.

If the number of the selected users (len(W)) is greater than 1, the process 700 proceeds to 720, where the network device 101 obtains a set of measurements for relevance (delta) and a convergence rate (cRate). In some embodiments, the act at 720 may be performed by using the MU-MIMO ANN algorithm as described above.

At 730, the network device 101 determines whether the number of the selected users (len(W)) is equal to or less than threshold number (uNum) and the convergence rate (cRate) is less than a predetermined threshold.

If the number of the selected users (len(W)) is greater than threshold number (uNum) or the convergence rate (cRate) is greater than the predetermined threshold, the process 700 proceeds to 740, where the network device 101 determines a maximum measurement in the set of measurements.

At 750, the network device 101 updates the user set (W) by removing a candidate user associated with the maximum measurement from the user set W. At 760, the user set (W) is output.

On the other hand, if the network device 101 determines at 710 the number of the selected users (len(W)) is equal to or less than 1, the process 700 proceeds to 760, where the user set (W) is output.

If the network device 101 determines at 730 the number of the selected users (len(W)) is equal to or less than threshold number (uNum) and the convergence rate (cRate) is less than a predetermined threshold, the process 700 proceeds to 760, where the user set (W) is output.

As an example rather than limitation, computer instructions for implementing the example process 700 may be constructed as the following.
ANN Greedy Algorithm with the End Condition Based on Convergent Rate
Input:
   Ĥ: Channel estimation with receive beamforming matrix, which is (S,Nt) size
   Selected user number: uNum, where uNum<S, S is the total candidate user number
Output:
   Selected user set: W
Initialization:
   Set initial user set W: it includes all candidate users, so len(W)=S
   Set rateThreshold value, rateThreshold value is related with learning rate, based on testing, the good rateThreshold=0.72 for learn rate=0.7
ANN Greedy Algorithm Main Routine:
   While len(W)>1:
     Run MU-MIMO ANN algorithm for user set W, get the delta and cRate
     If len(W)<=uNum and cRate<rateThreshold: break
     Find the user u which has the maximum delta value: u=argmax$_{u \in W}$(delta[u])
     Update user set: W=W†{u}
output: W
End of ANN Greedy Algorithm with the End Condition Based on Convergent Rate In the ANN Greedy algorithm with end condition based on convergent rate as descried above, there is one super parameter, which is referred to as rateThreshold. This super parameter is related with the selected learning rate. In case learning rate=0.7 and adjRate=0.85, the testing is performed to verify which value is better for rateThreshold. The testing is listed in Table 4.

TABLE 4

| rateThreshold | 0.75 | 0.72 | 0.7 | 0.67 |
| --- | --- | --- | --- | --- |
| S = 12; Nt = 6 | 9.045524143 | 9.046041121 | 9.003749437 | 8.943294371 |
| S = 12; Nt = 12 | 10.41376957 | 10.41133038 | 10.40313657 | 10.36995959 |
| S = 12; Nt = 20 | 10.78981017 | 10.78981017 | 10.78981017 | 10.78701426 |

In Table 4, for each row, 200 same sample datas are used for different rateThreshold. It is found that 0.72 is good value for learning rate=0.7 and adjRate=0.85. In fact, the absolute value difference is quite small.

Figure 8:
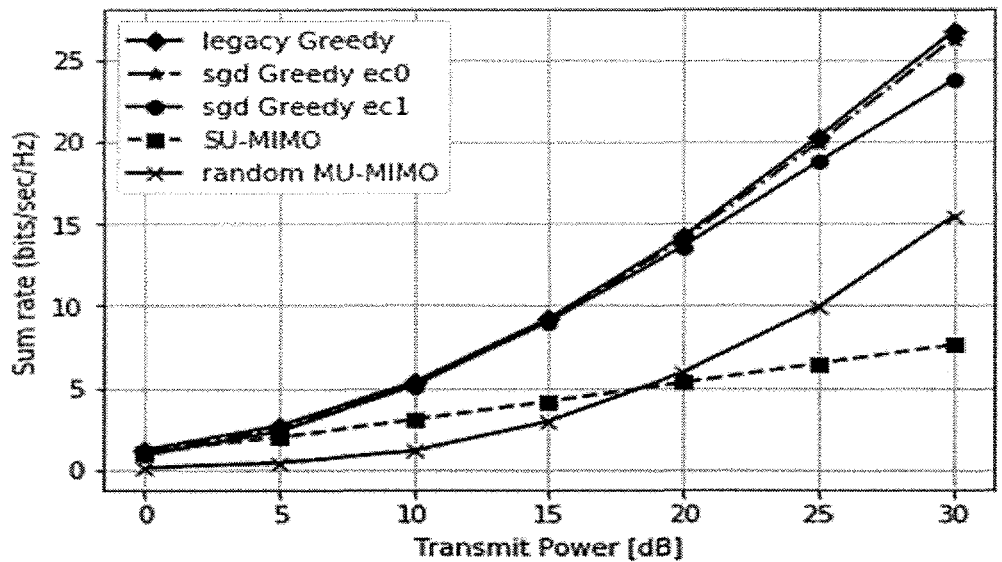
FIGS. 8 to 10 shows performance comparison of user selection method according to embodiments of the present disclosure and conventional methods.
Figure 9:
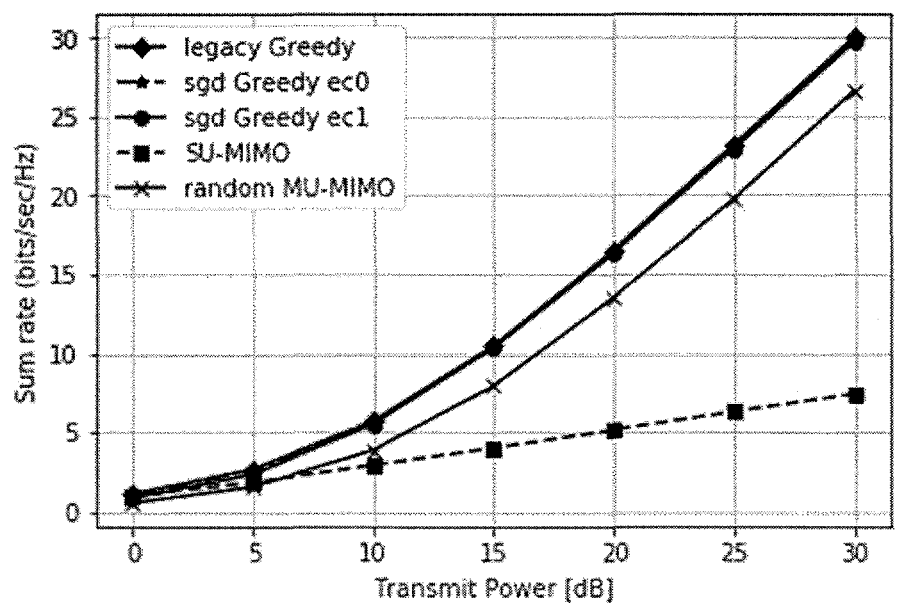
Figure 10:
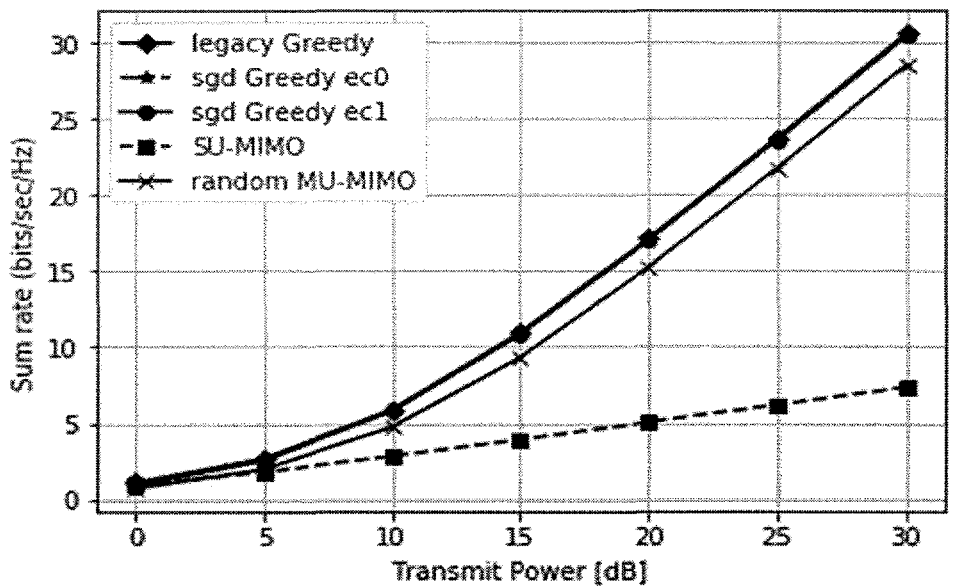

To verify advantage of the proposed user selection solution, performance of some embodiments of the solution have been compared with conventional methods, and results of the comparison are shown in FIGS. 8 to 10.

The testing cases are based on following normalization:
Ĥ element is generated by normal distribution N(0,1)/sqrt (Nt)
y is generated by uniform random selection of {−1,1} which is simulation of BPSK modulation In FIGS. 8 to 10, "sgd Greedy ec0" represents testing results by using ANN Greedy algorithm with end condition based on channel capacity, "sgd Greedy ec1" represents testing results by using ANN Greedy algorithm with end condition based on convergent rate; "random MU-MIMO" represents selecting uNum users by using random selection method; "SU-MIMO" represents only selecting one user, to check the gain of MU-MIMO; "legacy greedy" represents testing results by using the conventional ZF greedy algorithm.

FIG. 8 shows results of the comparison in case 1, where total user S=12, Nt=6, selected user number uNum=6, sample data for each power=500. It can be seen from FIG. 8 that the three curves representing "sgd Greedy ec0", "sgd Greedy ec1" and "legacy greedy" are almost overlapped. ANN Greedy algorithm with end condition based on channel capacity almost has the same capacity as ZF greedy algorithm. ANN Greedy algorithm with end condition based on convergent rate is a little bit worse than ZF greedy algorithm in high power case.

FIG. 9 shows results of the comparison in case 2, where total user S=12, Nt=12, selected user number uNum=6, sample data for each power=500. FIG. 10 shows results of the comparison in case 3, where total user S=12, Nt=20, selected user number uNum=6, sample data for each power=500. It can be seen from FIGS. 9 and 10 that the three curves representing "sgd Greedy ec0", "sgd Greedy ec1" and "legacy greedy" are almost overlapped. This means that there are no big difference between ANN greedy algorithm according to the present disclosure and ZF greedy algorithm Since ANN computing capacity is O(NrNt), the computing complexity of the ANN greedy algorithm according to the present disclosure is:

$$\sum_{K=uNum}^{S} O(KNt)$$

If it is supposed that uNum=S/2, the computing complexity of the ANN greedy algorithm according to the present disclosure is $O(S^2 Nt)$ It should be noted that embodiments of the present disclosure can be used both for DL and UL MU-MIMO user selection. ANN greedy algorithm as described can provide basic user selection service for MU-MIMO user scheduling mechanism, for example, for different user Qos based scheduling methods. ANN greedy algorithm has same level capacity gain as ZF greedy algorithm. ANN greedy algorithm has lower computing complexity, compared with ZF greedy algorithm. ANN greedy algorithm can use ANN implemented in HW(DSP, GPU, FPGA) easily, this can remove most computing consuming of CPU.

In some embodiments, an apparatus capable of performing the method 200 (for example, the network device 101) may comprise means for performing the respective steps of the method 200. The means may be implemented in any suitable form. For example, the means may be implemented in a circuitry or software module.

In some embodiments, the apparatus comprises: means for performing scheduling for a set of candidate terminal devices by: obtaining a set of received signals; determining a set of measurements for relevance among the candidate terminal devices based at least on the set of received signals and channel estimation for the set of candidate terminal devices; determining a maximum measurement in the set of measurements; and updating the set of candidate terminal devices by removing a candidate terminal device associated with the maximum measurement from the set of candidate terminal devices.

In some embodiments, performing scheduling includes iteratively doing until an end condition is met, the end condition including one of the following: the number of the candidate terminal devices being less than or equal to a threshold number and channel capacity for the set of candidate terminal devices being less than channel capacity for the updated set of candidate terminal devices; the number of the candidate terminal devices being less than or equal to the threshold number and a convergence rate being below than a predetermined threshold, the convergence rate being determined based on a change in a sum of the measurements.

In some embodiments, wherein determining the set of measurements for relevance comprises iteratively performing the following at least once until an iteration number is equal to a predetermined number: determining residue between each received signal and its corresponding output of an artificial neuron network, ANN, having an input layer and an output layer, each of row vectors of a stream channel matrix being an input of the ANN, each of the receiving signals being an output of the ANN, an activation function for a neuron of the output layer being a linear activation function, the stream channel matrix being a product of a channel estimation matrix and a receiving beamforming matrix for the set of candidate terminal devices; determining the set of measurements for relevance based on the residue; and updating a set of weights of the ANN based on a gradient descent algorithm.

In some embodiments, updating the set of weights of the ANN comprises: determining a set of adjust rates for a learning rate based on the row vectors; determining a set of adjusted learning rates based on the set of adjust rates; and updating the set of weights based on the set of adjusted learning rates, the residue and the stream channel matrix.

In some embodiments, determining the set of measurements for relevance comprises: determining a relevance measurement between a first candidate terminal device and a plurality of second candidate terminal devices in the set of candidate terminal devices based on the following: a size of a projection of a first channel vector for the first candidate terminal device on a space constructed by channel vectors for the second candidate terminal devices, the first candidate terminal device being different from any of the second candidate terminal devices.

In some embodiments, obtaining the set of received signals comprises: determining lengths of row vectors in the stream channel matrix; arranging the row vectors in an order of the lengths; assigning transmitted symbols to the arranged row vectors so that different transmitted symbols are assigned to adjacent row vectors; and determining products of the transmitted symbols and lengths of the arranged row vectors as the set of received signals.

Figure 11:
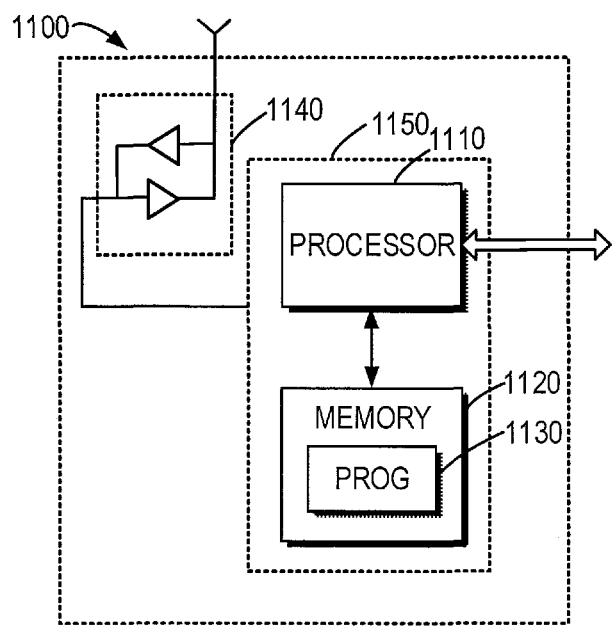
FIG. 11 shows a block diagram of a device suitable for implementing embodiments of the present disclosure.

FIG. 11 is a simplified block diagram of a device 1100 that is suitable for implementing embodiments of the present disclosure. The device 1100 can be considered as a further example implementation of the network device 101 as shown in FIG. 1. Accordingly, the device 1100 can be implemented at or as at least a part of the network device 101.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1120 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and UE.

The program 1130 is assumed to include program instructions that, when executed by the associated processor 1110, enable the device 1100 to operate in accordance with the embodiments of the present disclosure, as discussed herein with reference to FIGS. 1 to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 200, 400 500 600, 700 as described above with reference to FIGS. 2 and 4 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for user selection, comprising:
for a whole set of candidate terminal devices, performing scheduling by:
obtaining a set of received signals;
determining a set of measurements for relevance among the candidate terminal devices based at least on the set of received signals and channel estimation for the set of candidate terminal devices, wherein determining the set of measurements for relevance is iteratively performed at least once until an iteration number is equal to a predetermined number and comprises:
determining residue between each received signal and its corresponding output of an artificial neuron network (ANN), having an input layer and an output layer, each of row vectors of a stream channel matrix being an input of the ANN, each of the receiving signals being an output of the ANN, an activation function for a neuron of the output layer being a linear activation function, the stream channel matrix being a product of a channel estimation matrix and a receiving beamforming matrix for the set of candidate terminal devices,
determining the set of measurements for relevance based on the residue, and
updating a set of weights of the ANN based on a gradient descent algorithm;
determining a maximum relevance measurement in the set of measurements; and
updating the set of candidate terminal devices by removing a candidate terminal device associated with the maximum relevance measurement from the set of candidate terminal devices.

2. The method of claim 1, wherein performing scheduling includes iteratively doing until an end condition is met, the end condition including one of the following:
the number of the candidate terminal devices being less than or equal to a threshold number and channel capacity for the set of candidate terminal devices being less than channel capacity for the updated set of candidate terminal devices; and
the number of the candidate terminal devices being less than or equal to the threshold number and a convergence rate being below than a predetermined threshold, the convergence rate being determined based on a change in a sum of the measurements.

3. The method of claim 1, wherein updating the set of weights of the ANN comprises:
determining a set of adjust rates for a learning rate based on the row vectors;
determining a set of adjusted learning rates based on the set of adjust rates; and
updating the set of weights based on the set of adjusted learning rates, the residue and the stream channel matrix.

4. The method of claim 1, wherein determining the set of measurements for relevance comprises:
determining a relevance measurement between a first candidate terminal device and a plurality of second candidate terminal devices in the set of candidate terminal devices based on
a size of a projection of a first channel vector for the first candidate terminal device on a space constructed by channel vectors for the second candidate terminal devices, the first candidate terminal device being different from any of the second candidate terminal devices.

5. The method of claim 1, wherein obtaining the set of received signals comprises:
determining lengths of row vectors in the stream channel matrix;
arranging the row vectors in an order of the lengths;
assigning transmitted symbols to the arranged row vectors so that different transmitted symbols are assigned to adjacent row vectors; and
determining products of the transmitted symbols and lengths of the arranged row vectors as the set of received signals.

6. A device for user selection, comprising:
at least one processor; and
at least one memory including computer program code;
the at least one memory and the computer program code configured to, with the at least one processor, cause the device to at least:
for a whole set of candidate terminal devices, perform scheduling by:
obtaining a set of received signals;
determining a set of measurements for relevance among the candidate terminal devices based at least on the set of received signals and channel estimation for the set of candidate terminal devices, wherein determining the set of measurements for relevance is iteratively performed at least once until an iteration number is equal to a predetermined number and comprises:
determining residue between each received signal and its corresponding output of an artificial neuron network (ANN), having an input layer and an output layer, each of row vectors of a stream channel matrix being an input of the ANN, each of the receiving signals being an output of the ANN, an activation function for a neuron of the output layer being a linear activation function, the stream channel matrix being a product of a channel estimation matrix and a receiving beamforming matrix for the set of candidate terminal devices,
determining the set of measurements for relevance based on the residue, and
updating a set of weights of the ANN based on a gradient descent algorithm;
determining a maximum relevance measurement in the set of measurements; and
updating the set of candidate terminal devices by removing a candidate terminal device associated with the maximum relevance measurement from the set of candidate terminal devices.

7. The device of claim 6, wherein performing scheduling includes iteratively doing until an end condition is met, the end condition including one of the following:
the number of the candidate terminal devices being less than or equal to a threshold number and channel capacity for the set of candidate terminal devices being less than channel capacity for the updated set of candidate terminal devices; and the number of the candidate terminal devices being less than or equal to the threshold number and a convergence rate being below than a predetermined threshold, the convergence rate being determined based on a change in a sum of the measurements.

8. The device of claim 6, wherein updating the set of weights of the ANN comprises:
   determining a set of adjust rates for a learning rate based on the row vectors;
   determining a set of adjusted learning rates based on the set of adjust rates; and
   updating the set of weights based on the set of adjusted learning rates, the residue and the stream channel matrix.

9. The device of claim 6, wherein determining the set of measurements for relevance comprises:
   determining a relevance measurement between a first candidate terminal device and a plurality of second candidate terminal devices in the set of candidate terminal devices based on
   a size of a projection of a first channel vector for the first candidate terminal device on a space constructed by channel vectors for the second candidate terminal devices, the first candidate terminal device being different from any of the second candidate terminal devices.

10. The device of claim 6, wherein obtaining the set of received signals comprises:
    determining lengths of row vectors in the stream channel matrix;
    arranging the row vectors in an order of the lengths;
    assigning transmitted symbols to the arranged row vectors so that different transmitted symbols are assigned to adjacent row vectors; and
    determining products of the transmitted symbols and lengths of the arranged row vectors as the set of received signals.

11. A computer program embodied on a non-transitory computer-readable medium, the computer program comprising encoded instructions which, when executed by a processor, cause the processor to carry out a method for user selection, the method comprising:
    for a whole set of candidate terminal devices, performing scheduling by:
    obtaining a set of received signals;
    determining a set of measurements for relevance among the candidate terminal devices based at least on the set of received signals and channel estimation for the set of candidate terminal devices, wherein determining the set of measurements for relevance is iteratively performed at least once until an iteration number is equal to a predetermined number and comprises:
        determining residue between each received signal and its corresponding output of an artificial neuron network (ANN), having an input layer and an output layer, each of row vectors of a stream channel matrix being an input of the ANN, each of the receiving signals being an output of the ANN, an activation function for a neuron of the output layer being a linear activation function, the stream channel matrix being a product of a channel estimation matrix and a receiving beamforming matrix for the set of candidate terminal devices,
        determining the set of measurements for relevance based on the residue, and
        updating a set of weights of the ANN based on a gradient descent algorithm;
    determining a maximum relevance measurement in the set of measurements; and
    updating the set of candidate terminal devices by removing a candidate terminal device associated with the maximum relevance measurement from the set of candidate terminal devices.

* * * * *